(12) United States Patent
Ring

(10) Patent No.: US 6,205,661 B1
(45) Date of Patent: Mar. 27, 2001

(54) METHOD OF MAKING A ROCKET THRUST CHAMBER

(76) Inventor: Peter John Ring, 20335 Hickory Hill Way, Saratoga, CA (US) 95070

( * ) Notice: Subject to any disclaimer, the term of this patent is extended or adjusted under 35 U.S.C. 154(b) by 0 days.

(21) Appl. No.: 09/293,513

(22) Filed: Apr. 15, 1999

(51) Int. Cl.[7] .................................................... B23P 15/00
(52) U.S. Cl. ........................................ 29/890.01; 29/523
(58) Field of Search .................... 29/890.01, 523; 60/260

(56) References Cited

U.S. PATENT DOCUMENTS

| | | | |
|---|---|---|---|
| 3,230,613 | 1/1966 | Rechin et al. ........................ | 29/157 |
| 3,315,471 | 4/1967 | Dailey et al. ........................ | 60/203 |
| 3,354,652 | 11/1967 | Novotny et al. ..................... | 60/260 |
| 3,694,883 | 10/1972 | Olcott .................................. | 29/157 C |
| 3,723,742 | 3/1973 | Aranguren et al. ................. | 250/106 |
| 3,780,533 | 12/1973 | Huang ................................. | 60/260 |
| 3,897,316 | * 7/1975 | Huang ................................. | 29/890.01 |
| 4,707,225 | 11/1987 | Schuler et al. ...................... | 204/9 |
| 4,917,968 | 4/1990 | Tuffias et al. ....................... | 428/621 |
| 4,942,653 | 7/1990 | Hawkinson ......................... | 29/890.01 |
| 5,154,352 | 10/1992 | Buckreus ............................ | 239/127.1 |
| 5,375,325 | 12/1994 | Bales et al. ......................... | 29/890.01 |
| 5,613,299 | * 3/1997 | Ring et al. .......................... | 29/890.01 |
| 5,701,670 | * 12/1997 | Fisher et al. ........................ | 29/890.01 |

* cited by examiner

*Primary Examiner*—I Cuda
(74) *Attorney, Agent, or Firm*—Skjerven Morrill MacPherson; Alan H. MacPherson

(57) ABSTRACT

A fabricating method for a one-piece refractory metal rocket engine chamber is described. Hollow liner sections of a platinum group metal or alloy are inserted into a chamber barrel portion to form the combustion chamber, connecting into a conical portion, a venturi throat and into a second conical portion, forming an expansion nozzle exit of the chamber. The hollow liner sections correspond to the interior shapes of the chamber portions. A refractory metal split hollow mandrel completes an assembly which is subjected to a hot isostatic pressing cycle. This HIP cycle expands the hollow mandrel, supporting the liner, outward against the chamber wall, pressure bonding the liner sections to the chamber portions. Scarfed edges of the liner sections are also bonded. The split mandrel is then chemically removed from the chamber resulting in a lined rocket engine chamber.

10 Claims, 3 Drawing Sheets

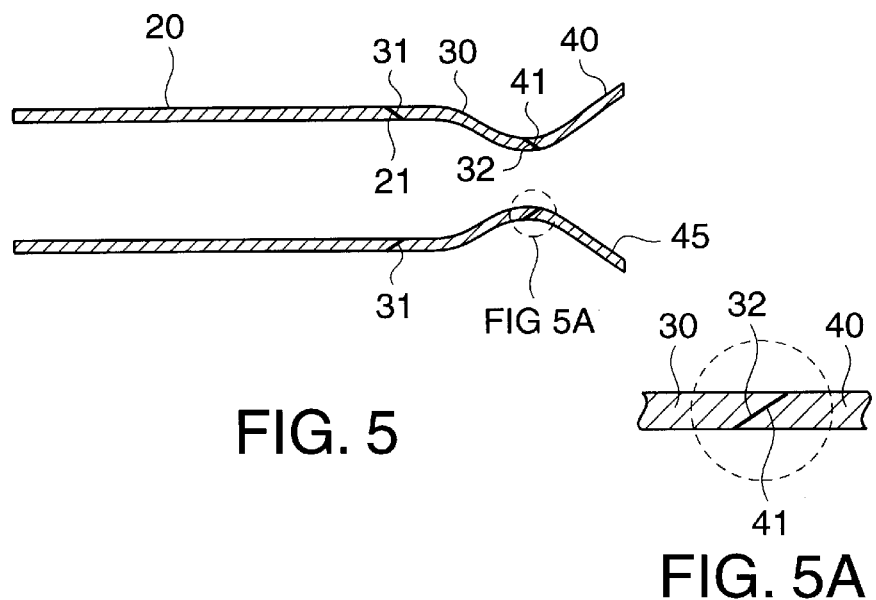
FIG. 5
FIG. 5A
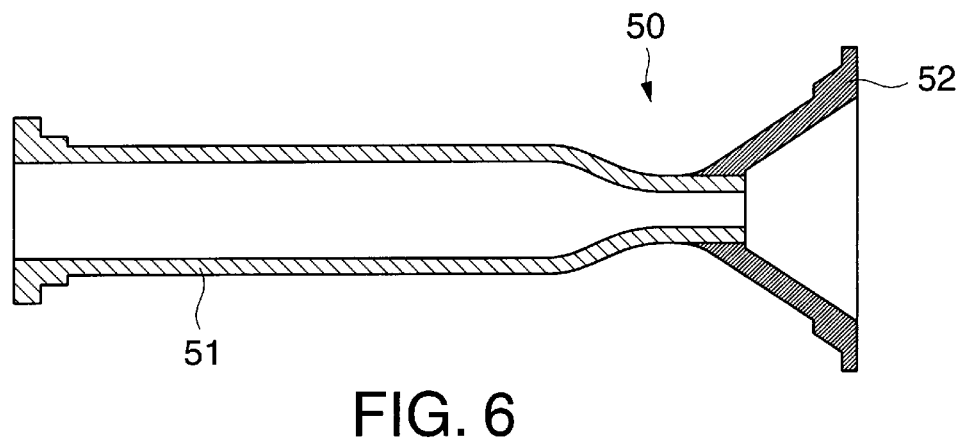
FIG. 6
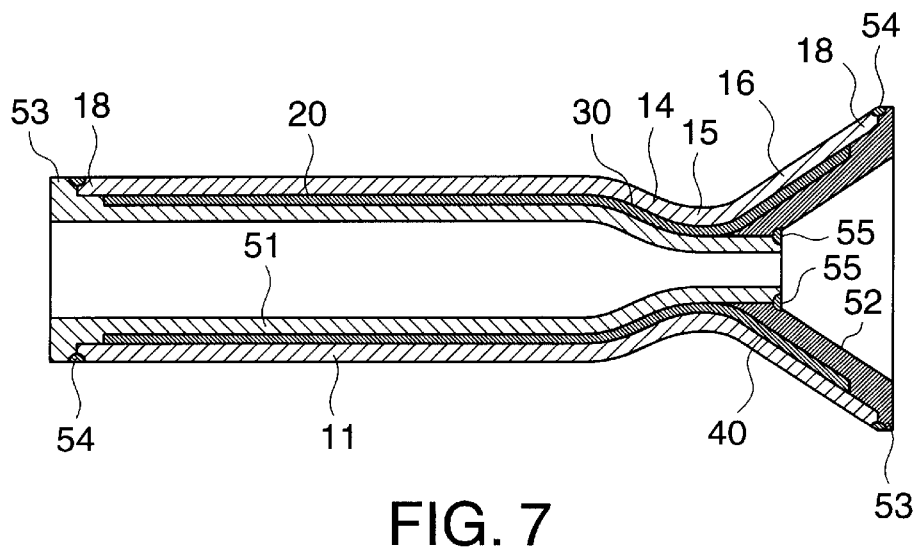
FIG. 7

METHOD OF MAKING A ROCKET THRUST CHAMBER

FIELD OF THE INVENTION

This invention relates to a rocket thrust chamber for thrusters or bipropellant rocket engines. More particularly, the invention is directed to high temperature thrust chambers for relatively small rocket engines generally of about 5–100 pounds of thrust, which are difficult to cool regeneratively.

BACKGROUND OF THE INVENTION

Rocket engine liquid fueled thrust chambers of the larger thrust type, typically of many hundreds, many thousands or even millions of pounds of thrust, employ regeneratively cooled thrust chambers where pressurized (pumped) propellant is first passed through thrust engine tubing or channels forming the shell or cooling jacket of the chamber, before being injected into the combustion chamber. The cool fuel or oxidizer in a bipropellant system, for example, liquid oxygen at −180° C. or other oxidizer, thus keeps the combustion chamber at a sufficiently low temperature to preserve the structural integrity of the thrust chamber. In the case of smaller thrust thrusters used for intermittent thrust control of a space vehicle or satellite, thrust chambers have employed film cooling. Film cooling employs a protective coating of propellant which is sprayed along the inner surface of the thrust chamber. Evaporation of the film cools the chamber wall. Although film cooling is efficient, it is to be avoided since it lowers the overall specific thrust by using propellant for a purpose other than producing thrust. Regeneratively cooled engines are considered more efficient since coolant is not wasted but, in fact, augments the initial energy at injection by its increased heat content.

Conventional thrusters currently in use have a minimal upper temperature limit of about 2400° F. (1315° C.) and a limited life span of about ten hours. These conventional thrusters, using a hydrazine propellant for example, and a thrust chamber constructed of niobium alloys, necessarily will use about 40% of the fuel for film cooling in order to keep the thrust chamber walls below this temperature. Since the propellant is the major mass item for satellites being put in space, a considerable incentive exists to decrease or obviate the need for film cooling and hence the amount of on-board fuel.

U.S. Pat. No. 3,354,652 discusses the difficulty of regeneratively cooling small liquid propellant engines resulting inter alia in boiling or decompositon of the coolant within the coolant jacket. While it has been suggested to apply high temperature insulation, e.g., metal oxides, to the combustion side of the chamber to reduce the coolant bulk temperature during steady state firing, this can result, upon engine shut down, in additional stored heat in the insulation causing localized heating and decomposition of remaining stagnant propellant. The patent somewhat solves the problem by suggesting a tantalum alloy liner coupled with a stagnant gas or vacuum enclosed space and helical two-way flow coolant channels.

U.S. Pat. No. 3,780,533 discloses the use in regeneratively cooled chambers utilizing cooling channels, of a composite wall including a deposit of electroformed nickel, or a sheet of nickel or of refractory alloys, such as copper-silver or molybdenum-rhenium alloys, brazed to lands in a middle wall component U.S. Pat. No. 3,315,471 shows with respect to thrusters utilizing radioisotope fuel, structural elements of the thruster, namely spaced shells, preferably constructed of tungsten. U.S. Pat. No. 3,723,742 shows the use of noble metals and refractory metals surrounding a radioisotope fuel casing.

U.S. Pat. No. 4,917,968 decribes a thrust chamber structure where a ductile layer of a platinum group metal including iridium is deposited by chemical vapor deposition on a mandrel and a layer of refractory metal deposited thereover also by chemical vapor deposition, with a solid solution of the two metals present between and metallurgically bonded to the two metal layers.

U.S Pat. No. 5,613,299 describes a thrust chamber structure where a layer of a platinum group metal, including iridium, is bonded to the interior of a refractory alloy thrust chamber by pressurizing the exterior of the chamber forcing the chamber to collapse onto the liner, itself supported on a solid mandrel. This present invention differs from the above by having a hollow mandrel so that the interior of the chamber is pressurized and the liner expanded outwards.

SUMMARY OF THE INVENTION

The present invention is directed to a fractory metal one-piece thrust chamber for use in a bipropellant rocket engine employing, for example, hydrazine and nitrogen tetroxide propellants. The chamber typically constructed of refractory alloys such as niobium, tantalum, tantalum (10%)-tungsten, rhenium or rhenium-tungsten alloys, is formed by spin forming, swaging or is machined from bar stock, into which discrete liner sections of platinum group metals (e.g., rhodium, iridium or their alloys) are bonded by diffusion bonding, explosive boding, hot isostatic pressing (HIP), isostatic forging, rapid omnidirectional compaction or by the Ceracon process which utilizes fused silica to apply bonding pressure. A cylindrical first liner section of oxidation resistant material such as rhodium, rhodium alloy, e.g., platinum (80%)-rhodium (20%) alloy or other material selected to provide oxidation protection to the chamber walls, is sized to be bonded to a cylindrical barrel portion of the refractory metal chamber. An essentially conical second liner section of iridium, rhodium, iridium-rhodium alloy or other material selected to provide oxidation protection to the chamber walls, is constructed to be bonded to the downstream end of the barrel portion and to a converging conical portion of the chamber. By scarfed end the second liner section is bonded to a scarfed end of the first liner section. [Alternatively the first and second sections can be fabricated as a single piece.] The second liner section extends from the barrel portion along the inner surface of a first conical portion of the chamber. An essentially conical third liner section of iridium or rhodium or an iridium-rhodium alloy or other material selected to provide oxidation protection to the chamber walls, is constructed to be bonded to a second diverging conical portion of the chamber and also by a scarfed end joined to a scarfed end on an overlapping end of the second liner section. The third liner section forms an engine expansion nozzle with the second conical portion of the outside chamber. High bonding pressure is applied usually at elevated temperature to pressure bond the overlapping liner sections together and to pressure bond the lining sections to the respective thrust chamber portions.

In a preferred fabrication process a refractory alloy thrust chamber is constructed to final size in all aspects except that the chamber is extended in length at each end to allow seal welding of an internal hollow mandrel to the ends of the chamber. The protective liner sections are assembled onto the split, hollow mandrel and placed within the hollow confines of the refractory alloy thrust chamber. The hollow mandrel is preferably constructed of niobium although other materials for example steel can be used. The protective liner sections are assembled 'on the mandrel to' confirm fit, particularly at the overlapping scarfed joints. The mandrel is then separated at the split and reassembled within the refractory alloy thrust chamber. The total liner length is designed and constructed to meet the thrust chamber design longitudinal dimension, i.e., without the oversize ends the mandrel however is sized to correspond to the extended chamber length. The ends of the mandrel are electron beam welded to each end of the thrust chamber and the welds helium leak checked. A final weld is then made to join both halves of the hollow mandrel together at the throat region of the mandrel. The entire assembly is again helium leak checked. The completed assembly is then preferably hot isostatically pressured using a high pressure and temperature in an argon atmosphere. The mandrel is then chemically removed; leaving the liner metallurgically bonded to the thrust chamber walls.

BRIEF DESCRIPTION OF THE DRAWINGS

FIG. 5 is a schematic longitudinal cross section of the assembled liner sections showing the scarfed connection joints with an enlarged view of one of the joints.

FIG. 5A is a cross-sectional view of the interface between converging conical section 30 and diverging conical section 40.

FIG. 6 is a schematic longitudinal cross sectional view of a hollow split mandrel used to position the liner sections into the refractory metal thrust chamber.

FIG. 7 is a schematic cross sectional view of the assembled refractory metal thrust chamber, the three liner sections and the split hollow mandrel.

DETAILED DESCRIPTION

Figure 1:
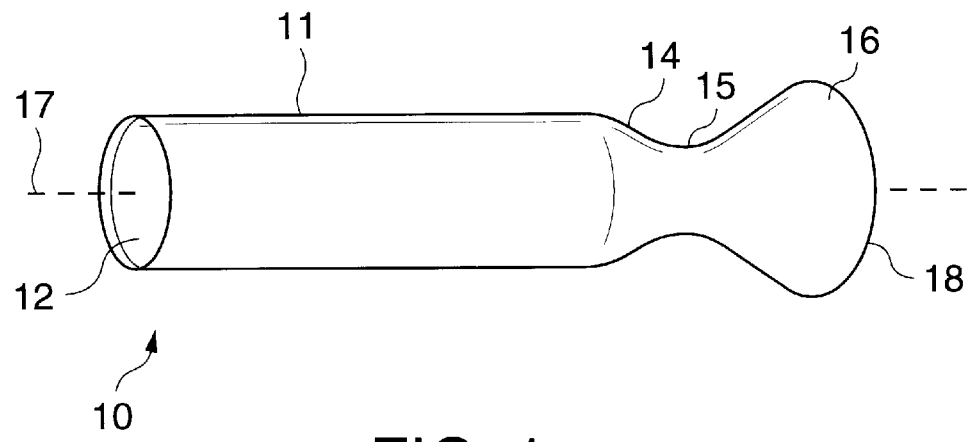
FIG. 1 is a schematic perspective view of the refractory metal thrust chamber.

Referring to FIG. 1, a refractory metal or refractory alloy thrust chamber 10 is fabricated by any one of standard fabrication processes such as spin forming from a plate or tube, swaging from tube stock or machined from bar stock. In fabricating these chambers to the venturi shape, it may be necessary to use split mandrels or mandrels that are later removed by chemical dissolution. The integral chamber is of one-piece construction and includes a cylindrical barrel portion 11, the interior 12 of which forms a combustion chamber, a first essentially conical portion 14 upstream of a venturi throat 15, and a second essentially conical portion 16 downstream from throat 15 forming an expansion nozzle exit 18. These portions are arranged along a longitudinal central axis 17.

The refractory metal or refractory alloy may be rhenium, rhenium-tungsten alloy, tantalum-tungsten alloy, columbium-hafnium alloy, tungsten-rhenium-hafnium carbide alloy, molybdenum-rhenium alloy or other refractory alloys with relatively high melting points, i.e., over 2000° C. and high tensile stress, i.e., over 10,000 psi at 2000° C.

Figure 2:
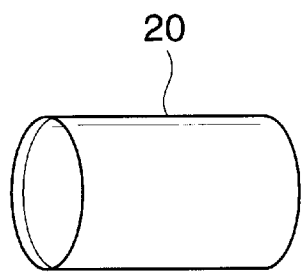
FIG. 2 is a schematic perspective view of a first liner section.

FIG. 2 illustrates a cylindrical first liner section 20 which is sized to be generally coextensive with the interior periphery of portion 11 save for the oversized (0.6 cm) ends 18 (FIG. 7) of the chamber 10. Section 20 is fabricated from a highly oxidation resistant material, e.g., rhodium or platinum or their alloys, or a material forming a protective oxide coating, to provide maximum oxidation protection for the region of the thrust chamber to be exposed to the more highly oxidizing fuel/oxidizer mixture. Oxidation resistance is measured by weight loss or recession in $mg/cm^2/hr$. The preferred materials will have a weight loss less than 1 $mg/cm^2/hr$. The liner for this region is formed from sheet into a cylinder by any suitable method, e.g., by roll forming, drawing or directly by spin forming.

Figure 3:
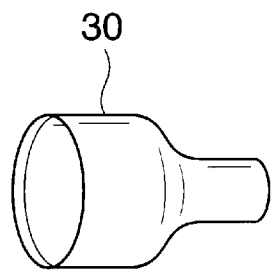
FIG. 3 is a schematic perspective view of a second liner section.

FIG. 3 illustrates an essentially conical second liner section 30 sized to be generally coextensive with the interior periphery of portion 14. This conical section leading from the barrel to the venturi throat is fabricated from the above described oxidation protective material by a suitable method such as spin forming, which is the preferred method although other methods, e.g., roll forming, are acceptable.

Figure 4:
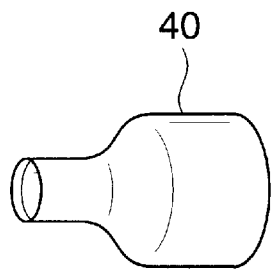
FIG. 4 is a schematic perspective view of a third liner section.

FIG. 4 illustrates an essentially conical third liner section 40 sized to be coextensive with the interior periphery of portion 16 save for end 18. Liner section 40 is constructed in the same manner as liner section 30 and is constructed also from the above described oxidation protective material. Each of the liner sections 20, 30 and 40 in a typical construction have a sheet thickness of 0.05 cm or greater.

All three liner sections as seen in FIG. 5 are provided with an additional length to form an overlapping or scarfed joint not less than about 0.15 cm in overlap. The scarf or chamber/bevel angles on the abutting liner sections are opposite from each other to provide effecting mating. As to the downstream sections, i.e., 20 vs. 30 and 30 vs. 40, the latter sections 30 and 40 respectively are closest to the thrust chamber exit 45. Scarf 31 thus overlaps scarf 21 and scarf 41 overlaps scarf 32. In certain applications, a specific diffusion barrier of rhenium or tungsten foil (~0.2 mm thickness) may be inserted between the iridium and/or rhodium liner and the refractory alloy (Ta-10W alloy) thrust chamber wall.

As seen in FIG. 6, a split hollow mandrel 50 has a first part 51 sized to correspond to the interior periphery of sections 20 and 30 and a second part 52 sized to correspond with the interior periphery of section 40. The split mandrel is fabricated from steel, niobium, molybdenum, molybdenum alloy or suitable alternate. Assembly of the chamber and mandrel is illustrated in FIG. 7. The liner is first assembled onto the mandrel to confirm fit and conformance, particularly the overlapping joints. The split hollow mandrel is then separated into its two halves and each mandrel half, pre-fitted with the appropriate liner section, inserted into the refractory alloy thrust chamber from opposite ends. Each of the sections of the liner on the mandrel are slidingly assembled within the thrust chamber portions with a close fit clearance of approximately 0.15 mm. The barrel section of the split mandrel 51 is inserted within the thrust chamber barrel and the exit cone section of the mandrel 52 within the exit cone portion of the chamber.

The 1.0 cm of additional thrust chamber length at each end 18 is thus free of liner. The extended ends of the mandrel 1.0 cm long 53 also free of liner are made a close fit to the chamber to facilitate electron beam (EB) welding of the mandrel ends into the chamber ends. A circumferential electron beam seam weld 54 is used to seal each end of the assembly. The two halves of the hollow mandrel are electron beam melded together as shown in 55. Since the two halves are EB welded there will be a vacuum in the annulus between the chamber and the mandrel. This ensures good diffusion bonding between the liner and the chamber wall.

Figure 8:
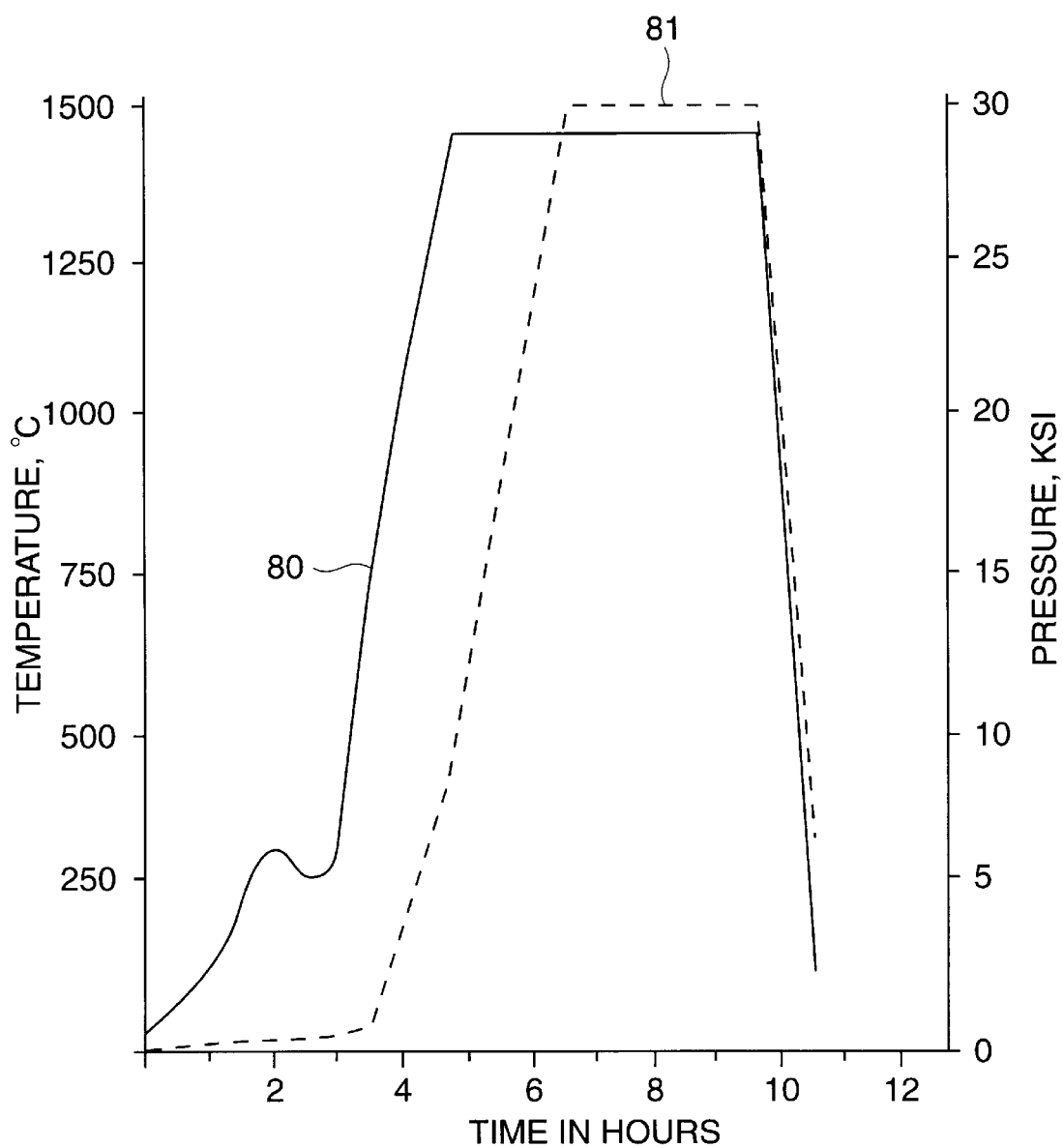
FIG. 8 is a time-temperature-pressure cycle graph of the preferred hot isostatic bonding process.

The assembly of FIG. 7 is then diffusion bonded, e.g., hot isostatically pressed (HIP'd) together following the pressure/time/temperature cycle shown in FIG. 8 where the solid line 80 is the temperature/time line and the dash line 81 is the pressure/time line. The HIP'ing process produces a strong metallurgical bond between the thrust chamber and the liner material. A total process time of about 13 hours generally is needed when pumping time and full cooling time are considered. Several different cycles or combinations of temperature time and pressure can and have been used. The cycle described below is typical.

The following steps detail the hot isostatic pressing (HIP) cycle to be followed in press forming the preferred thrust chamber portions, the liner sections and mandrel/end plugs together.

(1) Evacuate the HIP chamber.

(2) Flush with argon and bake in argon at 260° C. (500° F.) +/−20° C. (68° F.) for 30 minutes +/−5 minutes at 200 psi +/−20 psi. NOTE: When dumping argon, pressure in HIP chamber should not be reduced below one atmosphere.

(3) Repeat step (2).

(4) Raise temperature to 800° C. (1427° F.) at a rate of approximately 20° C./min letting pressure increase naturally with temperature.

(5) Raise temperature from 800° C. (1472° F.) to 1450° C. (2642° F.) at a rate of approximately 10° C./min. Increasing pressure at 100 psi/min until the temperature reaches 1450° C.

(6) Maintain temperature at 1450° C. (2642° F.) +/−50° C. (122° F.) and increase pressure to 30,000 psi at a rate of approximately 200 psi/min.

(7) Maintain temperature at 1450° C. (2642° F.) +/−50° C. (122° F.) and the pressure at 30,000 psi +/−250 psi for 3 hours +/−20 minutes.

(8) Reduce temperature at approximately 20° C./min, allowing the pressure to decrease at its natural rate resulting from the cooling, i.e., do not add or vent argon during this step.

(9) After the temperature has decreased to 100° C. (212° F.), the residual argon pressure may be reduced at any convenient rate.

The above-mentioned HIP cycle pertains to bonding Re and/or Ta-10W with Ir and/or Pt—Rh alloys. Different HIP cycles are necessary for different material combinations.

The HIP chamber is comprised of a thick walled pressure vessel, which encloses a furnace which heats the argon gas. The HIP may be in the range of from about 1000° C. to about 1900° C. and the HIP pressure may be in the range of from about 20,000 psi to about 45,000 psi.

FIG. 8 illustrates the cycle graphically. Experiments have been performed using the above-mentioned HIP cycle. These experiments show that tantalum (90%)-tungsten (10%) is successfully bonded to iridium, rhodium and to platinum (80%)-rhodium (20%). Rhenium is also bonded to iridium, rhodium, and to platinum (80%)-rhodium (20%).

After the completion of the HIP cycle, the mandrel is chemically removed leaving the oxidation resistant liner metallurgically bonded within the thrust chamber.

The above description of embodiments of this invention is intended to be illustrative and not limiting. Other embodiments of this invention will be obvious to those skilled in the art in view of the above disclosure.

What is claimed is:

1. A method of fabricating a thrust chamber comprising:

forming a one piece hollow refractory metal thrust chamber having a barrel portion forming a combustion chamber, a first conical portion connecting the barrel portion to a venturi throat section, and a second conical portion extending downstream from the venturi throat portion and forming an expansion nozzle;

positioning a first hollow metal cylindrical liner section, having a first end and a scarfed second end, in said barrel portion;

positioning a second hollow metal liner section having a scarfed first end and a scarfed second end, the first end of said second hollow metal liner section being larger than the second end of said second hollow metal liner section, in said first conical portion, wherein said larger first end abuts and overlaps said second end of the first liner section;

positioning a third hollow metal liner section having a scarfed first end and a second end, the scarfed first end being smaller than the second end, in said second conical portion, wherein said scarfed first end of said third hollow metal liner section abuts and overlaps said second end of the second liner section;

inserting a split hollow mandrel within said liner sections;

forcing elements of said split hollow mandrel together to push said liner sections against a chamber wall;

sealing an end of said hollow mandrel to an end of said thrust chamber, wherein said hollow mandrel and said thrust chamber each have two ends; and expanding said hollow mandrel to push the liner sections against the chamber walls at sufficient pressure and heat to bond said liner sections to said chamber walls.

2. The method of claim 1 wherein said hollow refractory metal thrust chamber is made from a metal selected from a group consisting of niobium, tantalum, rhenium or their alloys.

3. The method of claim 1 wherein the metal of said first, second and third liners are selected from a group consisting of rhodium, platinum, iridium and alloys of said metals.

4. The method of claim 1 wherein said first, second and third liner sections are fabricated from a metal producing an oxidation resistant coating.

5. The method of claim 1 wherein said expanding step comprises hot isostatic pressing at a temperature of from about 1000° C. to 1900° C., at a pressure of from about 20,000 psi to 45,000 psi.

6. The method of claim 1 wherein said sealing step comprises electron beam (EB) welding ends of said mandrel into ends of said chamber, wherein a vacuum is created in the annulus between the chamber and the mandrel.

7. The method of claim 1 wherein said split hollow mandrel has a first part, sized to correspond to an interior periphery of said first and second liner sections, and a second part, sized to correspond to an interior periphery of said third liner section.

8. The method of claim 1 wherein said split hollow mandrel is fabricated from any metal in the group of metals consisting of steel, niobium, molybdenum, molybdenum alloy, and any suitable alternate.

9. The method of claim 1 wherein said inserting step comprises separating the split hollow mandrel into two halves, wherein each mandrel half is inserted into corresponding ends of said refractory alloy thrust chamber from opposite ends.

10. A method of fabricating a thrust chamber comprising:

forming a one piece hollow refractory metal thrust chamber have a barrel portion forming a combustion chamber, a first conical portion connecting the barrel portion to a venturi throat section, and a second conical portion extending downstream from the venturi throat portion and forming an expansion nozzle;

positioning a first hollow metal liner section, having a first cylindrical end and a second scarfed conical end, within said combustion chamber, wherein said first cylindrical end is positioned within said barrel portion and said second scarfed conical end is positioned within said first conical section of said venturi throat portion;

positioning a second hollow metal liner section, having a scarfed first end and a second end, the scarfed first end of said second hollow metal liner section being smaller than the second end of said second hollow metal liner section, in said second conical portion, wherein said scarfed first end of said second hollow metal liner section abuts and overlaps said second end of the first liner section;

inserting a split hollow mandrel within said liner sections;

forcing elements of said split hollow mandrel together to push said liner sections against a chamber wall;

sealing an end of said hollow mandrel to an end of said thrust chamber, wherein said hollow mandrel and said thrust chamber each have two ends; and expanding said hollow mandrel to push the liner sections against the chamber walls at sufficient pressure and heat to bond said liner sections to said chamber walls.

* * * * *